US011520349B2

(12) United States Patent
Matsui et al.

(10) Patent No.: US 11,520,349 B2
(45) Date of Patent: Dec. 6, 2022

(54) AUTONOMOUS DRIVING DEVICE

(71) Applicant: TOYOTA JIDOSHA KABUSHIKI KAISHA, Aichi (JP)

(72) Inventors: Hideyuki Matsui, Sunto-gun (JP); Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 16/827,045

(22) Filed: Mar. 23, 2020

(65) Prior Publication Data

US 2020/0218280 A1    Jul. 9, 2020

Related U.S. Application Data

(63) Continuation of application No. 16/035,794, filed on Jul. 16, 2018, now Pat. No. 10,642,278.

(30) Foreign Application Priority Data

Aug. 25, 2017    (JP) .............................. JP2017-162571

(51) Int. Cl.
*G05D 1/02*    (2020.01)
*G05D 1/00*    (2006.01)
(Continued)

(52) U.S. Cl.
CPC ........... *G05D 1/0274* (2013.01); *G01C 21/30* (2013.01); *G01C 21/32* (2013.01); *G05D 1/0061* (2013.01);
(Continued)

(58) Field of Classification Search
CPC .. G05D 1/0274; G05D 1/0061; G05D 1/0088; G05D 1/0212; G05D 1/024;
(Continued)

(56) References Cited

U.S. PATENT DOCUMENTS 8,521,352 B1    8/2013    Ferguson et al.
9,796,416 B2    10/2017    Fujii et al.
(Continued)

FOREIGN PATENT DOCUMENTS

JP    2016-038846 A    3/2016
WO    2016/151749 A1    9/2016

*Primary Examiner* — Brian P Sweeney
(74) *Attorney, Agent, or Firm* — Sughrue Mion, PLLC

(57) ABSTRACT

An autonomous driving device includes a map recording a content having different type for each position while one or a plurality of contents and positions are associated with each other, an acquisition unit acquiring the content corresponding to a first position on the map, a specification storage unit storing a plurality of autonomous driving modes of the vehicle and the type of content necessary for the execution of the modes in association with each other, a selection unit selecting an executable autonomous driving mode based on the type of content acquired by the acquisition unit and the type of content stored in the specification storage unit, and a control unit controlling the vehicle at the first position in the selected autonomous driving mode, the selection unit determines one autonomous driving mode based on an order of priority set in advance when there is a plurality of executable autonomous driving modes.

6 Claims, 17 Drawing Sheets

(51) Int. Cl.
  *G01C 21/30*  (2006.01)
  *G01C 21/32*  (2006.01)
  *B60W 50/08*  (2020.01)

(52) U.S. Cl.
  CPC ........... *G05D 1/0088* (2013.01); *G05D 1/024* (2013.01); *G05D 1/0212* (2013.01); *B60W 50/082* (2013.01); *G05D 2201/0213* (2013.01)

(58) Field of Classification Search
  CPC ......... G05D 2201/0213; G05D 1/0236; G05D 1/0251; G05D 1/0257; G05D 1/0276; G05D 1/0278; G05D 1/028; G05D 2201/02; G01C 21/30; G01C 21/32; B60W 50/082
  See application file for complete search history.

(56) References Cited

U.S. PATENT DOCUMENTS

| | | | |
|---|---|---|---|
| 10,222,796 B2 | 3/2019 | Ichikawa et al. | |
| 10,308,254 B2 | 6/2019 | Hirano et al. | |
| 10,310,508 B2 | 6/2019 | Kunisa et al. | |
| 10,579,056 B2 | 3/2020 | Matsumura | |
| 10,649,452 B2 | 5/2020 | Ichikawa et al. | |
| 10,654,482 B2 | 5/2020 | Urano et al. | |
| 10,895,875 B2 | 1/2021 | Hashimoto et al. | |
| 11,260,868 B2 | 3/2022 | Urano et al. | |
| 11,327,485 B2 | 5/2022 | Sato et al. | |
| 2016/0039428 A1 | 2/2016 | Odate | |
| 2018/0079413 A1* | 3/2018 | Herrero | B60W 30/10 |
| 2018/0113460 A1 | 4/2018 | Koda et al. | |

\* cited by examiner

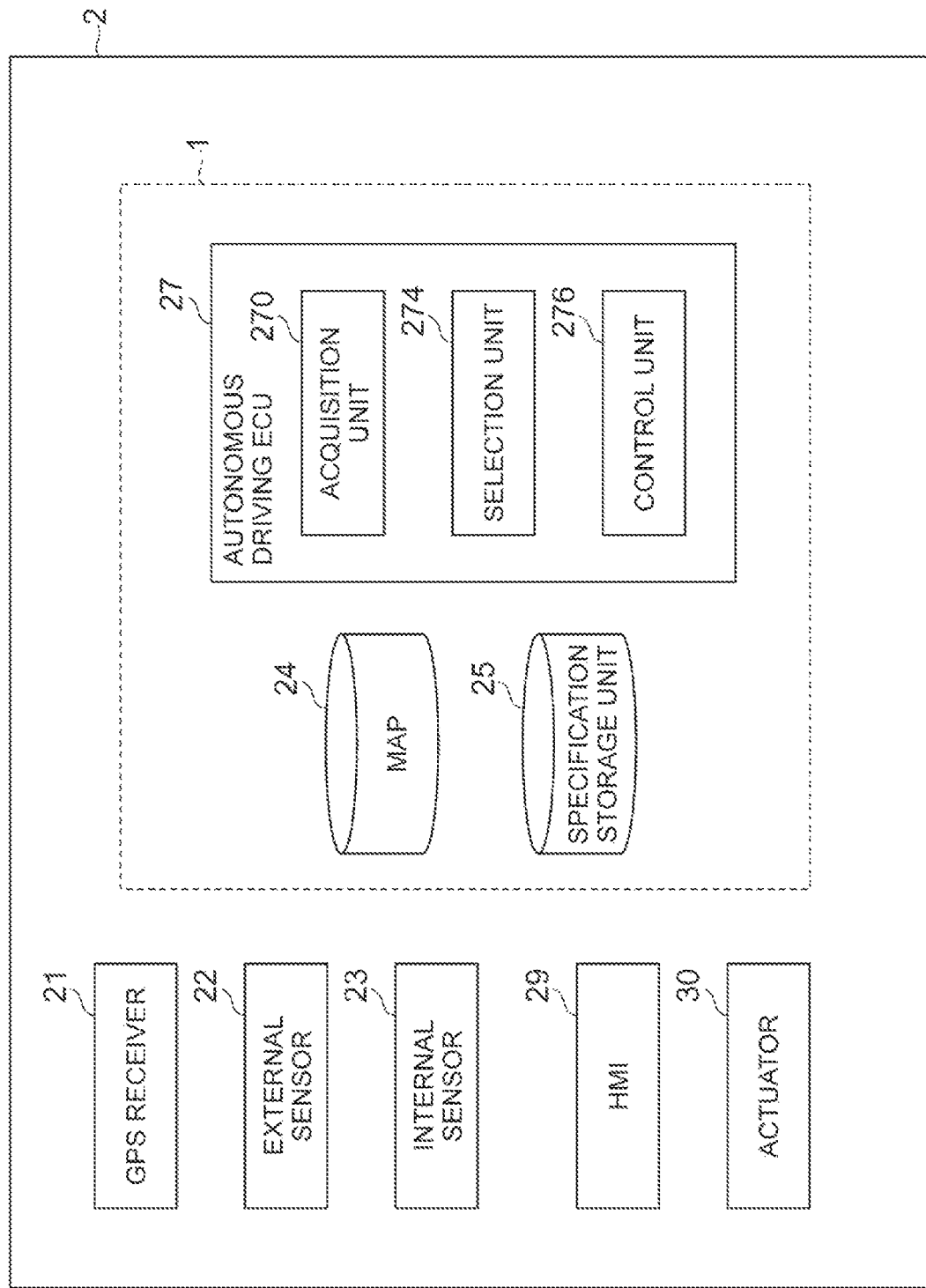

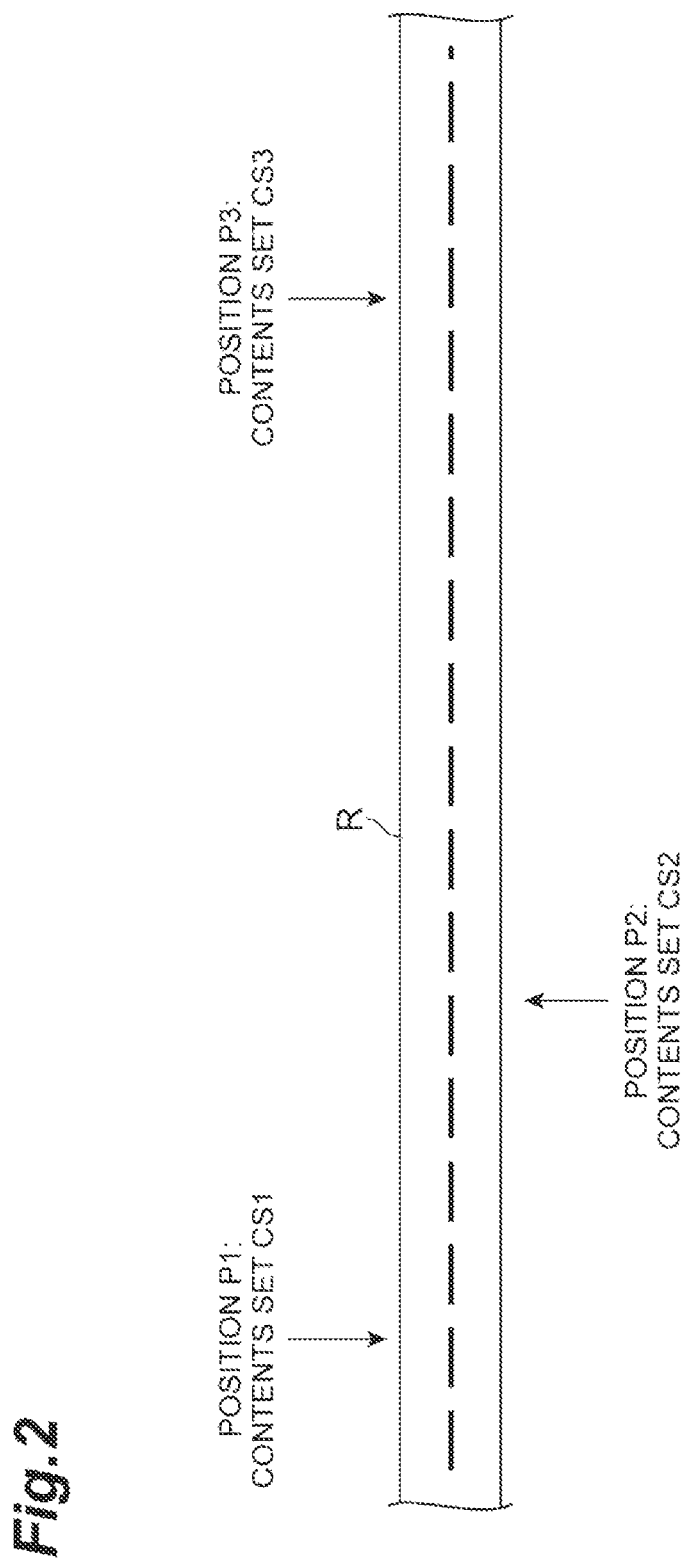

*Fig.3*

| CONTENTS | | | Position P1 | Position P2 | Position P3 | Position P4 | ... |
|---|---|---|---|---|---|---|---|
| STATIONARY OBJECT INFORMATION | RATE OF VARIATION [%] | | 0 | 20 | — | 80 | ... |
| | PRESENCE OF ABSENCE | | 0 | 1 | — | 1 | ... |
| TRAVELING PATH INFORMATION | | | 1 | — | 0 | 1 | ... |
| LAND SHAPE INFORMATION [Z] | | | 12 | 14 | 10 | — | ... |
| CURVATURE OF CURVE [1/m] | | | 0.0077 | 0.0077 | — | 0.0066 | ... |
| SPEED LIMIT [km/h] | | | 60 | 60 | 60 | — | ... |
| MAP FOR CAMERA (ORTHOCHROMATIC IMAGE) | | | 0 | 1 | 0 | 0 | ... |
| MAP FOR LIDAR [X,Y,Z] | SIGN BOARD | | 10,10,40 | 11,10,60 | — | 13,10,90 | ... |
| | POLE | | 10,10,0 | 11,10,0 | — | 13,10,0 | ... |
| | LANE BOUNDARY LINE | | 10,10,0 | 11,10,0 | — | 13,10,0 | ... |
| POSITION [X, Y] | | | 10,10 | 11,10 | 12,10 | 13,10 | ... |
| POSITION IDENTIFIER | | | POSITION P1 | POSITION P2 | POSITION P3 | POSITION P4 | ... |

| DRIVING MODE / CONTENTS | FIRST DRIVING MODE | SECOND DRIVING MODE | THIRD DRIVING MODE | FOURTH DRIVING MODE | FIFTH DRIVING MODE |
|---|---|---|---|---|---|
| MAP FOR LIDAR | ○ | ○ | — | — | — |
| MAP FOR CAMERA | — | — | ○ | — | — |
| SPEED LIMIT | ○ | ○ | ○ | ○ | — |
| CURVATURE OF CURVE | — | — | — | ○ | — |
| LAND SHAPE INFORMATION | ○ | ○ | ○ | — | — |
| TRAVELING PATH INFORMATION | ○ | ○ | — | — | — |
| STATIONARY OBJECT INFORMATION | ○ | — | — | — | — |

25

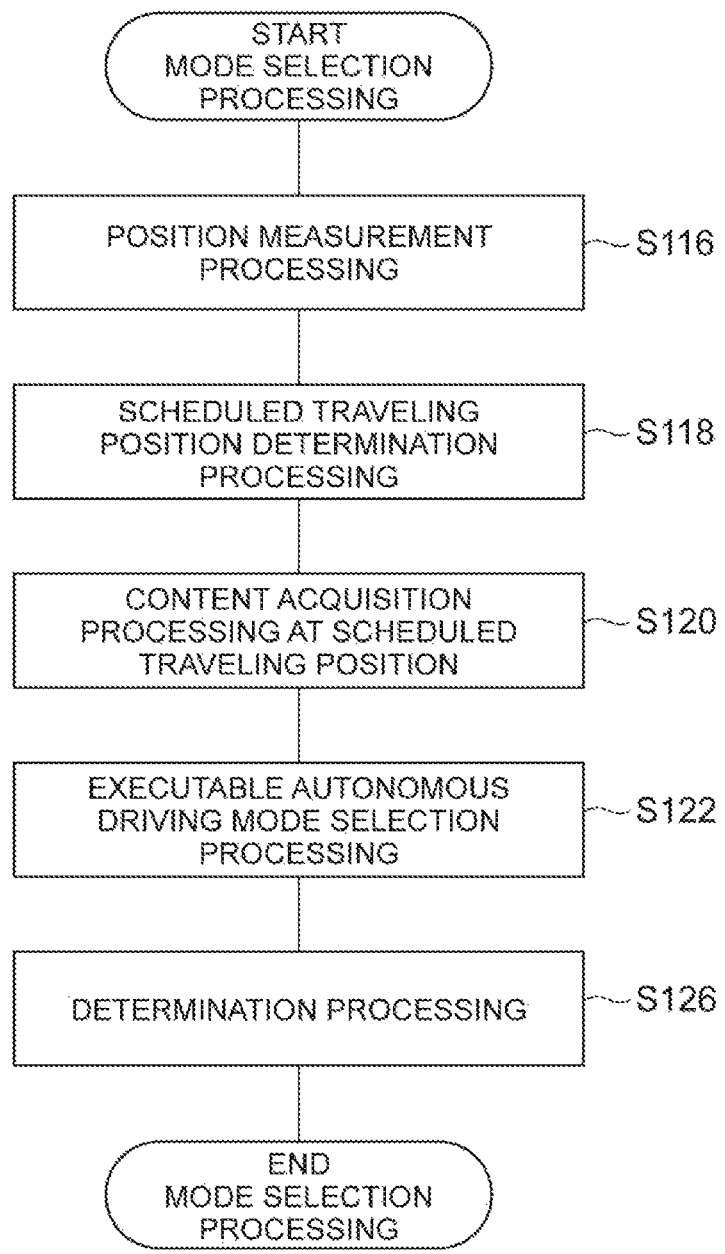

AUTONOMOUS DRIVING DEVICE

CROSS-REFERENCE TO RELATED APPLICATION

This application is a continuation of U.S. application Ser. No. 16/035,794 filed Jul. 16, 2018 (allowed) based on Japanese Patent Application No. 2017-162571 filed with Japan Patent Office on Aug. 25, 2017. The entire disclosures of the prior applications are considered part of the disclosure of the accompanying continuation application, and are hereby incorporated herein by reference in its entirety.

TECHNICAL FIELD

The present disclosure relates to an autonomous driving device.

BACKGROUND

U.S. Pat. No. 8,521,352 discloses a device that performs an autonomous driving on a vehicle. This device changes a first autonomous driving mode to a second autonomous driving mode when data is not present in a target area on a map. In the second autonomous driving mode, the device provides an instruction of an option to switch an operation mode to a manual operation mode while maintaining a safer distance from another vehicle than a normal distance by, for example, reducing a speed of the vehicle.

SUMMARY

The device disclosed in U.S. Pat. No. 8,521,352 provides only one executable autonomous driving mode when the map is insufficient. However, in the autonomous driving mode, for example, there are various modes, such as a mode in which a control is performed mainly using information acquired by a LIDAR and a mode in which the control is performed mainly using images acquired by a camera. In these autonomous driving modes, the data items necessary for the execution are different from each other. In other words, even though the first autonomous driving mode being executed cannot be continued due to the lack of the data in the map, in some cases, the second autonomous driving mode or the third autonomous driving mode can be executed as substitute modes.

In this technical field, it is desired to provide an autonomous driving device that can determine one autonomous driving mode from a plurality of executable autonomous driving modes.

An autonomous driving device according to an aspect of the present disclosure is configured to perform an autonomous driving of a vehicle and to include: a map configured to be allowed to record a content having different type for each position while one or a plurality of contents and positions are associated with each other; an acquisition unit configured to acquire the content corresponding to a first position on the map; a specification storage unit configured to store a plurality of autonomous driving modes of the vehicle and a type of content necessary for the execution of the modes in association with each other; a selection unit configured to select an executable autonomous driving mode from the plurality of autonomous driving modes based on the type of content acquired by the acquisition unit and the type of content stored in the specification storage unit; and a control unit configured to control the vehicle at the first position in the autonomous driving mode selected by the selection unit. The selection unit determines one autonomous driving mode based on an order of priority set in advance when there is a plurality of the executable autonomous driving modes.

In the autonomous driving device according to the aspect of the present disclosure, the selection unit selects the executable autonomous driving mode from a plurality of autonomous driving modes based on the type of content recorded in the map and the type of content necessary for the execution of the autonomous driving mode. When the number of executable autonomous driving modes is plural, one autonomous driving mode is determined based on the order of priority set to the autonomous driving modes in advance. As described above, when the number of executable autonomous driving modes is plural, the device can determine one autonomous driving mode according to the order of priority.

According to an embodiment, the map may be configured to record information on a stationary object as the content. The autonomous driving mode may include a first autonomous driving mode in which the information on the stationary object is acquired from the map and a second autonomous driving mode in which the information on the stationary object is acquired from a result of detection performed by a sensor. The selection unit may be configured to preferentially select the second autonomous driving mode than the first autonomous driving mode when the content acquired by the acquisition unit is the information on the stationary object and a current season is a season in which the information on the stationary object is sparse compared to the other seasons. In this configuration, in the season when the information on the stationary object obtainable from the map is expected to be sparse, the device can prioritize the autonomous driving based on the sensors rather than the autonomous driving based on the map.

According to an embodiment, the map may be configured to record the information on the stationary object as the content. The information on the stationary object may include a position of the stationary object and a rate of variation indicating a change of the stationary object per a unit time. The autonomous driving mode may include a first autonomous driving mode in which the information on the stationary object is acquired from the map and a second autonomous driving mode in which the information on the stationary object is acquired from the result of detection performed by a sensor. The selection unit may preferentially select the second autonomous driving mode than the first autonomous driving mode when the content acquired by the acquisition unit is the information on the stationary object and the rate of variation is equal to or greater than a predetermined value. In this configuration, when the information on the stationary object obtainable from the map is expected to be significantly changed, the device can prioritize the autonomous driving based on the sensors rather than the autonomous driving based on the map.

According to an embodiment, the autonomous driving device may be configured to further include a history storage unit configured to store the autonomous driving mode selected by the selection unit and the history information on the presence or absence of an override in association with each other. The selection unit does not to select the autonomous driving mode having the override occurrence rate equal to or greater than a predetermined value referring to the history storage unit. In this configuration, the device can preferentially select the automatic operation mode in which the override does not occur.

According to an embodiment, the autonomous driving device may be configured to further include a measuring unit configured to measure a position of the vehicle via communication and a determination unit configured to determine a plurality of consecutive scheduled traveling positions on the map based on the position of the vehicle measured by the measuring unit. The selection unit may select the executable autonomous driving mode at each of the plurality of consecutive scheduled traveling positions on the map determined by the determination unit. The selection unit may preferentially select the autonomous driving mode commonly executable at all the scheduled traveling positions from the executable autonomous driving modes selected for each of the scheduled traveling positions, as the autonomous driving mode executable at each of the plurality of consecutive scheduled traveling positions on the map. In this configuration, the device can avoid the switching of the autonomous driving mode every time the map data is insufficient.

According to various aspects of the present disclosure, it is possible to determine one autonomous driving mode from a plurality of executable autonomous driving modes.

BRIEF DESCRIPTION OF THE DRAWINGS

FIG. 1 is a block diagram illustrating an example of a configuration of a vehicle including an autonomous driving device in a first embodiment.

FIG. 2 is a diagram for explaining relationships between a position and a content set.

FIG. 3 illustrates an example of contents recorded in a map.

FIG. 4 illustrates an example of contents recorded in a specification storage unit.

FIG. 17 is a flowchart illustrating an example of mode selection processing.

DETAILED DESCRIPTION

Figure 5:
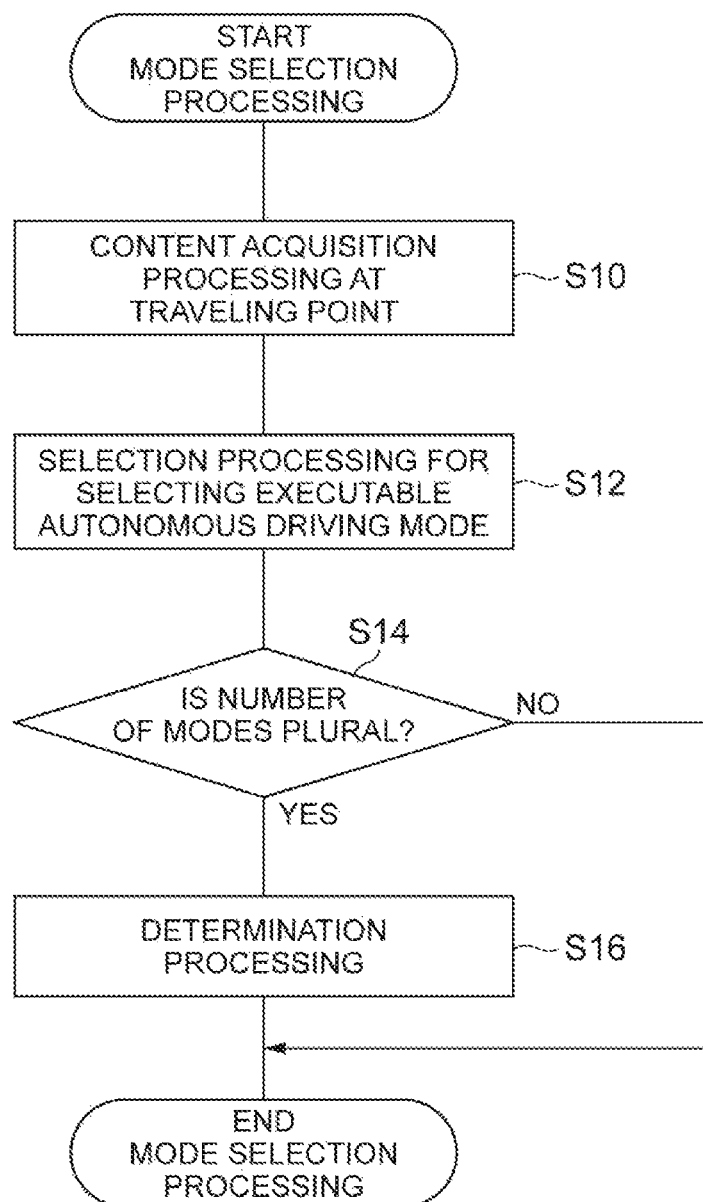
FIG. 5 is a flowchart illustrating an example of mode selection processing.

Hereinafter, exemplary embodiments will be described with reference to the drawings. In the following description, the same reference numerals will be given to the same or equivalent elements, and the description thereof will not be repeated.

First Embodiment

Configuration of an Autonomous Driving System

FIG. 1 is a block diagram illustrating an example of a configuration of a vehicle 2 including an autonomous driving device 1 in a first embodiment. As illustrated in FIG. 1, an autonomous driving device 1 is mounted on a vehicle 2 such as a passenger car.

The autonomous driving device 1 performs autonomous driving of the vehicle 2. The autonomous driving is a driving mode for causing the vehicle 2 to autonomously travel along a road on which the vehicle 2 travels. In the autonomous driving, there is a plurality of driving modes. For example, the autonomous driving may include a driving mode that causes the vehicle 2 to autonomously travel to a destination set in advance without a driver's driving operation. In addition, the autonomous driving may be a driving mode in which the autonomous steering (autonomous driving in steering) and autonomous speed adjustment (autonomous driving in speed) are combined. Details of the plurality of driving modes will be described later.

The vehicle 2 includes a GPS receiver 21, an external sensor 22, an internal sensor 23, a human machine interface (HMI) 29, and an actuator 30.

The GPS receiver 21 measures a position of the vehicle 2 (for example, the latitude and longitude of the vehicle 2) by receiving signals from three or more GPS satellites.

The external sensor 22 is a detection device that detects a surrounding environment of the vehicle 2. The external sensor 22 includes at least one of a camera and a radar sensor. The camera is an imaging device that images the external situation of the vehicle 2. The camera is provided, for example, on the inner side of a windshield of the vehicle 2. The camera may be a monocular camera or may be a stereo camera. The stereo camera has two imaging units that are arranged so as to reproduce a binocular parallax.

The radar sensor is a detection device that detects objects around the vehicle 2 using radio waves (for example, millimeter waves) or light. The radar sensor transmits the radio wave or light to the surroundings of the vehicle 2, and detects the objects by receiving radio waves or light reflected from objects. The radar sensor includes, for example, at least one of millimeter wave radar or a light detection and ranging (LIDAR).

The external sensor 22 may be prepared for each detection target. For example, the external sensor 22 may include a sensor for object detection and a dedicated sensor prepared for detecting a specific object. The dedicated sensor is, for example, a camera for detecting a traffic signal. In that case, the traffic signal and a signal state are detected by template matching using color information (for example luminance) of an image acquired by the camera and/or the shape of the image (for example, using Hough transform).

The internal sensor 23 is a detection device that detects a travel state of the vehicle 2. The internal sensor 23 includes a vehicle speed sensor, an accelerator sensor, and a yaw rate sensor. The vehicle speed sensor is a measuring device that measures a speed of the vehicle 2. As the vehicle speed sensor, for example, a vehicle wheel speed sensor is used, which is provided on vehicle wheels of the vehicle 2 or on a drive shaft rotating integrally with vehicle wheels, and measures a rotational speed of the vehicle wheels.

The accelerator sensor is a measuring device that measures the acceleration of the vehicle 2. The accelerator sensor may include a longitudinal accelerator sensor that measures acceleration in the longitudinal direction of the vehicle 2 and a lateral accelerator sensor that measures a lateral acceleration of the vehicle 2. The yaw rate sensor is a measuring device that measures a yaw rate (rotation angular velocity) around the vertical axis at the center of gravity of the vehicle 2. As the yaw rate sensor, for example, a Gyro sensor can be used.

The HMI 29 is an interface that performs inputting and outputting of the information between the autonomous driving device 1 and the occupants. The HMI 29 includes, for example, a display and a speaker. The HMI 29 outputs an image on the display and outputs a voice from the speaker according to a control signal from the autonomous driving device 1. The display may be a head-up display. As an example, the HMI 29 includes input devices (buttons, a touch panel, a voice input device, or the like) for accepting the input from occupants.

The actuator 30 is a device used for controlling the vehicle 2. The actuator 30 includes at least a throttle actuator and a brake actuator.

The throttle actuator controls a driving force of the vehicle 2 by controlling an amount of air (throttle opening degree) supplied to the engine according to the control signal from the autonomous driving device 1. If the vehicle 2 is a hybrid vehicle, in addition to the amount of air supplied to the engine, a control signal from the autonomous driving device 1 is input to a motor as a power source, and the driving force of the vehicle 2 is controlled. If the vehicle 2 is an electric vehicle, a control signal from the autonomous driving device 1 is input to a motor as a power source instead of the throttle actuator, and the driving force of the vehicle 2 is controlled. The motor as the power source in these cases configures the actuator 30.

The brake actuator controls the brake system according to the control signal from the autonomous driving device 1 and controls a braking force applied to the vehicle wheels of the vehicle 2. For example, a hydraulic brake system can be used as the brake system.

The steering actuator controls the driving of the assist motor for controlling the steering torque in the electric power steering system according to the control signal from the autonomous driving device 1. As a result, the steering actuator controls the steering torque of the vehicle 2.

The autonomous driving device 1 includes a map 24, a specification storage unit 25, and an autonomous driving electronic control unit (ECU) 27. The ECU is an electronic control unit including a central processing unit (CPU), read only memory (ROM), random access memory (RAM), and a controller area network (CAN) communication circuit.

The map 24 is a storage device that stores map information. The map 24 is configured in, for example, a hard disk drive (HDD) mounted on the vehicle 2.

The map 24 is a map in which one or a plurality of contents and a position are associated with each other. The contents are information associated with the position on the map. The contents include, for example, the presence or absence of a map for the LIDAR and a map for the camera, a content of a traffic rule, a curvature of a curve, land shape information, the presence or absence of path information, and stationary object information. The map for the LIDAR is information indicating a position of a stationary object that can be detected by the LIDAR, and is used for estimating (localizing) a position of the host vehicle based on the detection results of the LIDAR described later (localizing). The stationary object is an object fixed at a predetermined position on a map and does not move by itself. The stationary objects include, for example, road paints (including lane boundary lines such as white line and yellow line) and structures (curbs, poles, telephone poles, buildings, signs, trees, or the like). The map for the camera is an orthochromatic image obtained by orthogonally converting aerial photographs, and is used for estimating the position of the host vehicle based on the results of the camera imaging. The contents of the traffic rule include, for example, a speed limit or a temporary stop. The curvature of the curve is an inverse number of the curvature radius. The land shape information is information on the height and direction of the surface of the land. The path information is information on the path used for a travel control. The stationary object information includes the presence or absence of stationary objects and a rate of variations. The rate of variation is a value that indicates the change of a stationary object per a unit time in time series.

The map 24 can be associated with a content having a different type for each position. Hereinafter, a group made from one or a plurality of contents is referred to as a content set. FIG. 2 is a diagram for explaining relationships between the position and the content set. As illustrated in FIG. 2, each position is associated with content sets different from each other. For example, a position P1 and a content set CS1 are associated with each other. In addition, a position P2 and a content set CS2 are associated with each other. In addition, a position P3 and a content set CS3 are associated with each other.

The content set CS1, content set CS2, and content set CS3 are not organized in such a manner that the number of contents and the types of contents included therein are the same respectively. FIG. 3 illustrates an example of contents recorded in the map. As illustrated in FIG. 3, the groups of contents, that is, the content sets are associated with the positions. As an example, the content set CS1 associated with the position P1 includes the presence or absence of the map for the LIDAR and the map for the camera, the speed limit, the curvature of the curve, the land shape information, the presence or absence of the path information, and stationary object information. As an example, the content set CS2 associated with the position P2 includes the presence or absence of the map for the LIDAR and the map for the camera, the speed limit, the curvature of the curve, the land shape information, and stationary object information, and does not include the presence or absence of the path information. As an example, the content set CS3 associated with the position P3 includes the presence or absence of the map for the camera, the speed limit, the land shape information, and the presence or absence of path information, and does not include the map for the LIDAR, the curvature of the curve and the stationary object information. As described above, the type of content included in each content set for each position are different from each other. The map 24 may be stored in a storage device other than the storage device provided in the vehicle 2. The map 24 may be configured with two-dimensional information or three-dimensional information.

The autonomous driving ECU 27 is hardware for performing the overall management of the autonomous driving, and is a calculation device. The autonomous driving ECU 27 is connected to a network that communicates using, for example, a CAN communication circuit, and is connected so as to be able to communicate with the configuration elements of the vehicle 2. That is, the autonomous driving ECU 27 can refer to the result of measurement by the GPS receiver 21, the results of detection by the external sensor 22, the internal sensor 23, and the map 24, and the specification storage unit 25 described later. The autonomous driving ECU 27 can refer to the information input to the HMI 29. The autonomous driving ECU 27 can output a signal to the HMI 29 and the actuator 30.

In the autonomous driving ECU 27, for example, various functions are realized by loading a program stored in the ROM into the RAM and executing the program loaded in the RAM by the CPU. The autonomous driving ECU 27 may be configured with a plurality of ECUs.

The autonomous driving ECU 27 is configured to operate in a plurality of autonomous driving modes. Here, as an example, the autonomous driving ECU 27 is configured to operate in a first autonomous driving mode, a second autonomous driving mode, a third autonomous driving mode, a fourth autonomous driving mode, and a fifth autonomous driving mode.

The specification storage unit 25 is a database in which the a plurality of autonomous driving modes of vehicle 2 and the type of content required for the execution of the modes are associated with other. FIG. 4 illustrates an example of the contents recorded in the specification storage unit. As illustrated in FIG. 4, the specification storage unit 25 stores the type of content required for the execution of the mode in advance for each autonomous driving mode of the vehicle 2. Here, as an example, information items for the first autonomous driving mode, the second autonomous driving mode, the third autonomous driving mode, the fourth autonomous driving mode, and the fifth autonomous driving mode are stored.

First Autonomous Driving Mode

The first autonomous driving mode is a driving mode that causes the vehicle 2 to autonomously travel based on the result of detection by the LIDAR. As illustrated in FIG. 4, as an example, the map for the LIDAR, the speed limit, the land shape information, the path information and the stationary object information are essential for the first autonomous driving mode. The map for the LIDAR is used for estimating the position of the host vehicle. The estimation of the position of the host vehicle is processing for determines the position and orientation of the vehicle 2 on the map in detail, and is one of the autonomous driving processing items. The stationary object information is used for processing for distinguishing the stationary objects from the moving objects. The land shape information, the speed limit, and the path information are used for generating the path for the vehicle 2. The operation by the autonomous driving ECU 27 in the first autonomous driving mode will be described later.

Second Autonomous Driving Mode

The second autonomous driving mode is a driving mode that causes the vehicle 2 to autonomously travel based on the result of detection by the LIDAR similarly to the first autonomous driving mode. The second autonomous driving mode differs from the first autonomous driving mode in a point that the stationary object information is not essential, and other points are the same. In other words, in the processing for distinguishing the stationary objects from the moving objects, the second autonomous driving mode does not refer to the information of the map 24. The operation by the autonomous driving ECU 27 in the second autonomous driving mode will be described later.

Third Autonomous Driving Mode

The third autonomous driving mode is a driving mode that causes the vehicle 2 to autonomously travel based on the result of imaging by the camera. As illustrated in FIG. 4, the map for the camera, the speed limit, the land shape information, and the path information are essential for the third autonomous driving mode. The map for the camera is used for estimating the position of the host vehicle. The speed limit, the land shape information, and the path information can be used for generating the path for the vehicle 2. The operation by the autonomous driving ECU 27 in the third autonomous driving mode will be described later.

Fourth Autonomous Driving Mode

The fourth autonomous driving mode is driving mode in which the autonomous steering and the autonomous speed adjustment are combined. The autonomous steering is a lane tracing assist (LTA) as an example. The LTA is a control to autonomously perform the steering of the vehicle 2 so as not to deviate from the traveling lane based on the result of recognition of the lane boundary lines and a traveling trajectory of a preceding vehicle. The autonomous speed adjustment is a driving state in which the speed of the vehicle 2 is autonomously controlled. The autonomous speed adjustment includes an adaptive cruise control (ACC). For example, when there is no preceding vehicle in front of the vehicle 2, the ACC is a control to perform a constant-speed control that causes the vehicle 2 to perform a constant-speed traveling at a set speed set in advance, and is a control to perform a follow-up control that adjusts the speed of the vehicle 2 according to the vehicle-to-vehicle distance to the preceding vehicle when there is a preceding vehicle in front of the vehicle 2. As illustrated in FIG. 4, as an example, in the fourth autonomous driving mode, the speed limit and the curvature of the curve are essential. The speed limit and the curvature of the curve are used for generating the traveling trajectory of the vehicle 2. The operation by the autonomous driving ECU 27 in the fourth autonomous driving mode will be described later.

Fifth Autonomous Driving Mode

The fifth autonomous driving mode is a driving mode in which the autonomous steering and the autonomous speed adjustment are combined. The autonomous steering is a lane keeping assist (LKA) as an example. The LKA is a control to perform an autonomous steering of the vehicle 2 toward the center of the lane. The autonomous speed adjustment is a driving state in which the speed of the vehicle 2 is autonomously controlled. The ACC is included in the autonomous speed adjustment. As illustrated in FIG. 4, in the fifth autonomous driving mode, the information of the map 24 is not used. The operation by the autonomous driving ECU 27 in the fifth autonomous driving mode will be described later.

Returning to FIG. 1, the autonomous driving ECU 27 functionally includes an acquisition unit 270, a selection unit 274, and a control unit 276.

The acquisition unit 270 acquires the content corresponding to a first position on the map 24. The first position is the traveling position of the vehicle 2 as an example. The acquisition unit 270 acquires the position of the vehicle 2 on the map using, for example, the position information of the vehicle 2 received by the GPS receiver 21. The acquisition unit 270 acquires the content corresponding to the position (the first position) of the vehicle 2 referring to the map 24.

The selection unit 274 selects an executable autonomous driving mode from a plurality of autonomous driving modes based on the type of contents acquired by the acquisition unit 270 and the type of contents stored in the specification storage unit 25. As illustrated in FIG. 3 and FIG. 4, as the number of contents associated with the first position increases, possibly there may be a plurality of executable autonomous driving modes. For example, a content set that includes the speed limit and the path information is associated with the position P3. Therefore, the autonomous driving mode which is executable at the position P3 is only the fifth autonomous driving mode. On the other hand, all the contents are recorded for the position P1. Therefore, all of the first to fifth autonomous driving modes are executable at the position P1. As described above, in some cases there is a plurality of executable autonomous driving modes according to the position.

When there is a plurality of executable autonomous driving modes, the selection unit 274 selects an autonomous driving mode based on an order of priority assigned to the autonomous driving modes in advance. The order of priority set in advance is stored in, for example, the storage area of the autonomous driving ECU 27.

The control unit 276 controls the vehicle 2 at the first position in the autonomous driving mode selected by selection unit 274. The control unit 276 acquires the information necessary for the autonomous driving mode referring to the map 24, and causes the vehicle 2 to autonomously travel.

Operation of the Autonomous Driving Device

Hereinafter, an example of an autonomous driving method will be disclosed. FIG. 5 is a flowchart illustrating an example of mode selection processing. For example, the flowchart illustrated in FIG. 5 is executed by the autonomous driving device 1 at the timing when the ON-operation of the autonomous driving function by a driver of the vehicle 2 is received.

As illustrated in FIG. 5, as content acquisition processing (S10), the acquisition unit 270 of the autonomous driving ECU 27 acquires a content corresponding to the traveling point of the vehicle 2 from the map 24. As an example, the acquisition unit 270 acquires the content from the map 24 based on the position information of the vehicle 2 received by the GPS receiver 21.

Subsequently, as selection processing (S12), the selection unit 274 of the autonomous driving ECU 27 selects an executable autonomous driving mode from the first to fifth autonomous driving modes based on the type of the content acquired in the content acquisition processing (S10) and the type of content stored in the specification storage unit 25.

Figure 6:
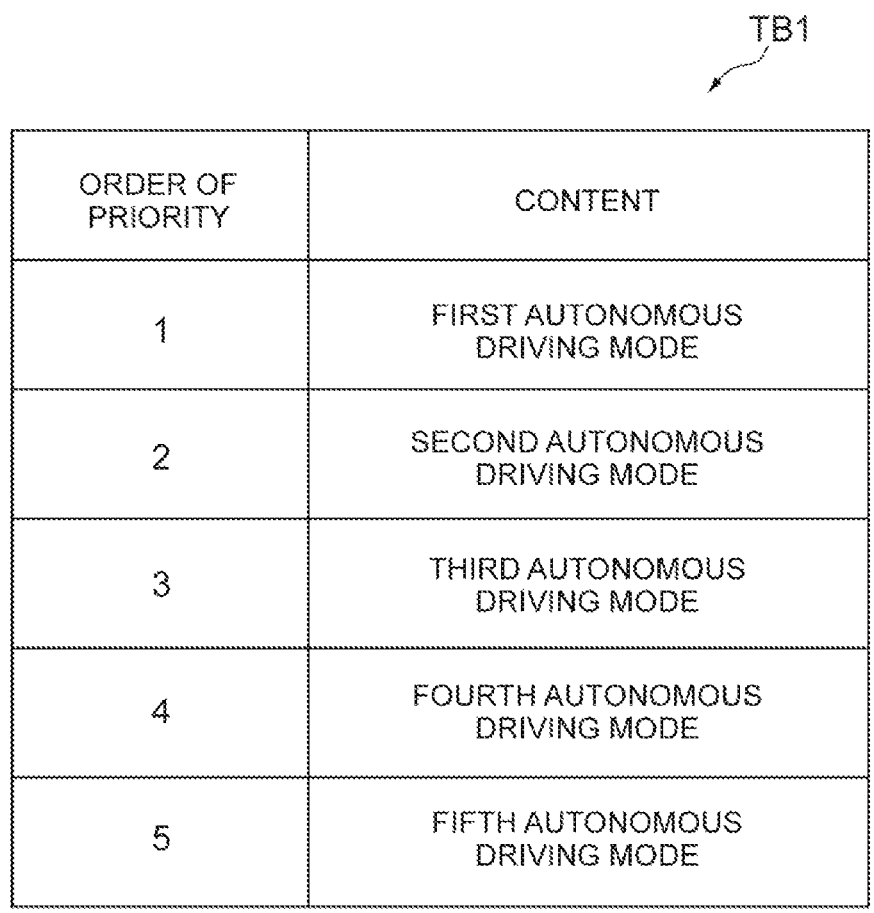
FIG. 6 illustrates an example of a priority table.

Subsequently, as determination processing (S14), the selection unit 274 determines whether or not the number of executable autonomous driving modes selected in the selection processing (S12) is plural or not. When it is determined the number of executable autonomous driving modes is plural (YES in S14), as determination process (S16), the selection unit 274 determines one autonomous driving mode according to an order of priority set in advance. FIG. 6 illustrates an example of the priority table. As illustrated in FIG. 6, in the priority table TB1, the order of priority and the driving mode order are stored in association with each other. As the order of priority number increases, the priority becomes higher. For example, when the first autonomous driving mode and the second autonomous driving mode are executable, the selection unit 274 acquires the order of priority "1" of the first autonomous driving mode and the order of priority "2" of the second driving mode order referring to the priority table TB1. The selection unit 274 compares the order of priority and selects the first autonomous driving mode.

When it is determined the number of executable autonomous driving modes is not plural (NO in S14) or if the determination processing (S16) is completed, the autonomous driving ECU 27 ends the flowchart illustrated in FIG. 5. Thus, the autonomous driving ECU 27 is configured to be able to select one executable autonomous driving mode according to the traveling position. The flowchart illustrated in FIG. 5 can be re-executed each time the traveling position changes or at a predetermined cycle.

Details of the First Autonomous Driving Mode

Figure 7:
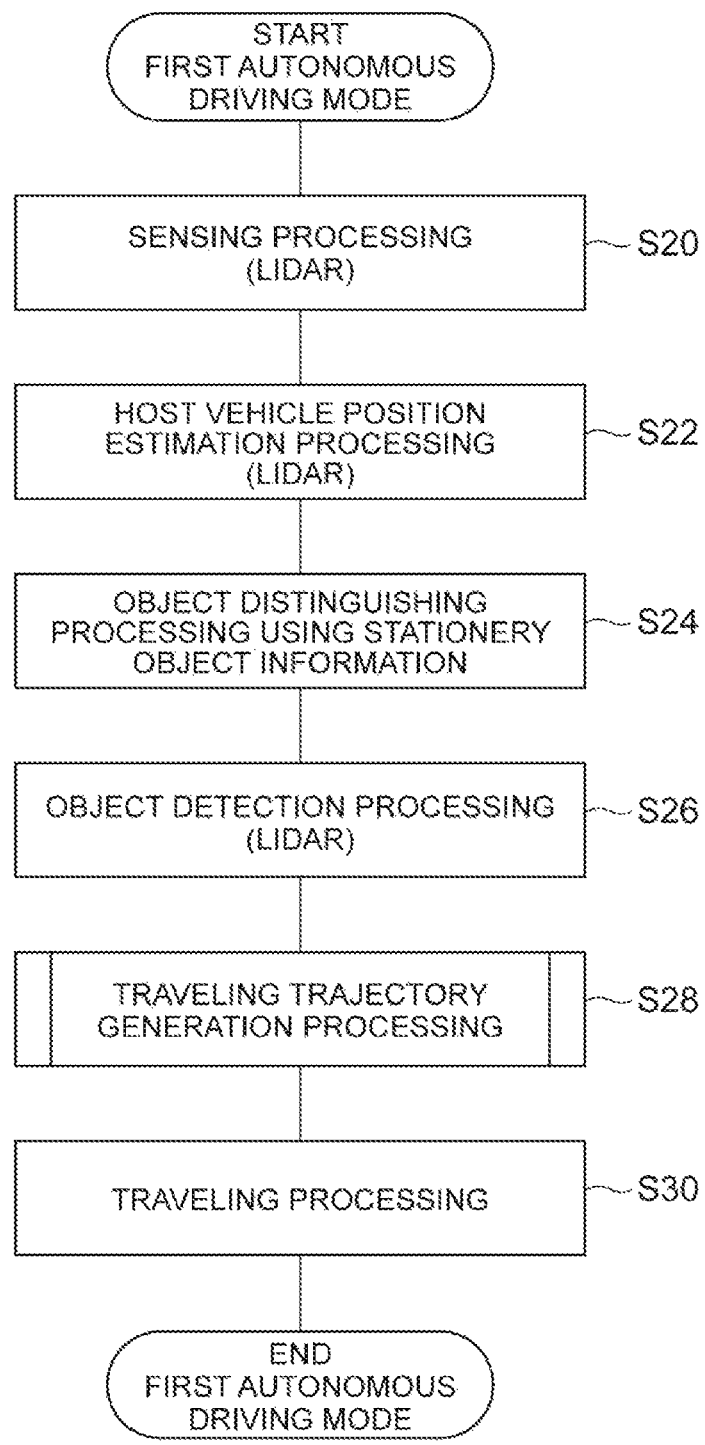
FIG. 7 is a flowchart illustrating an example of processing in a first autonomous driving mode.

FIG. 7 is a flowchart illustrating an example of processing in a first autonomous driving mode. The flowchart illustrated in FIG. 7 is executed by the autonomous driving device 1, for example, at the timing when the first autonomous driving mode is selected in the flowchart in FIG. 5.

As illustrated in FIG. 7, as sensing processing (S20), the control unit 276 of the autonomous driving ECU 27 acquires the result of detection performed by the LIDAR which senses the surroundings of the vehicle 2. Subsequently, as host vehicle position estimation processing (S22), the control unit 276 estimates the position and orientation of the vehicle 2 based on the result of detection obtained in the sensing processing (S20) performed by the LIDAR. The control unit 276 estimates the position and orientation of the vehicle 2 in which a position error between the features (the positions of the lane boundary line, the pole, and the sign board) included in the result of detection performed by the LIDAR and the features (the positions of the lane boundary line, the pole, and the sign board) recorded in the map for the LIDAR included in the map 24 becomes smallest, as the current position and orientation of the vehicle 2.

Subsequently, as object distinguishing processing (S24), the control unit 276 distinguishes the stationary object and the moving object from the detected object using the result of detection by the LIDAR and the stationary object information contained in the map 24. As the objects, the control unit 276 detects the moving objects such as pedestrians, bicycles, and other vehicles as well as the stationary objects that do not move such as telephone poles, guardrails, trees, and buildings. When the position of the object coincides with the stationary object information included in the map 24, the control unit 276 determines that the object is the stationary object. In addition, when the position of the object does not coincide with the stationary object information included in the map 24, the control unit 276 determines that the object is the moving object.

Subsequently, as object detection processing (S26), the control unit 276 recognizes the distinguished stationary object and the moving object based on the result of detection performed by the LIDAR. The control unit 276 measures an amount of movement of the detected moving object at that time by applying the Kalman filter, a particle filter, or the like to the detected moving object. The amount of movement includes a moving direction and a moving speed of the moving object. The amount of movement may also include a rotating speed of the moving object. The autonomous driving ECU 27 may perform error estimation of the amount of movement.

Figure 8:
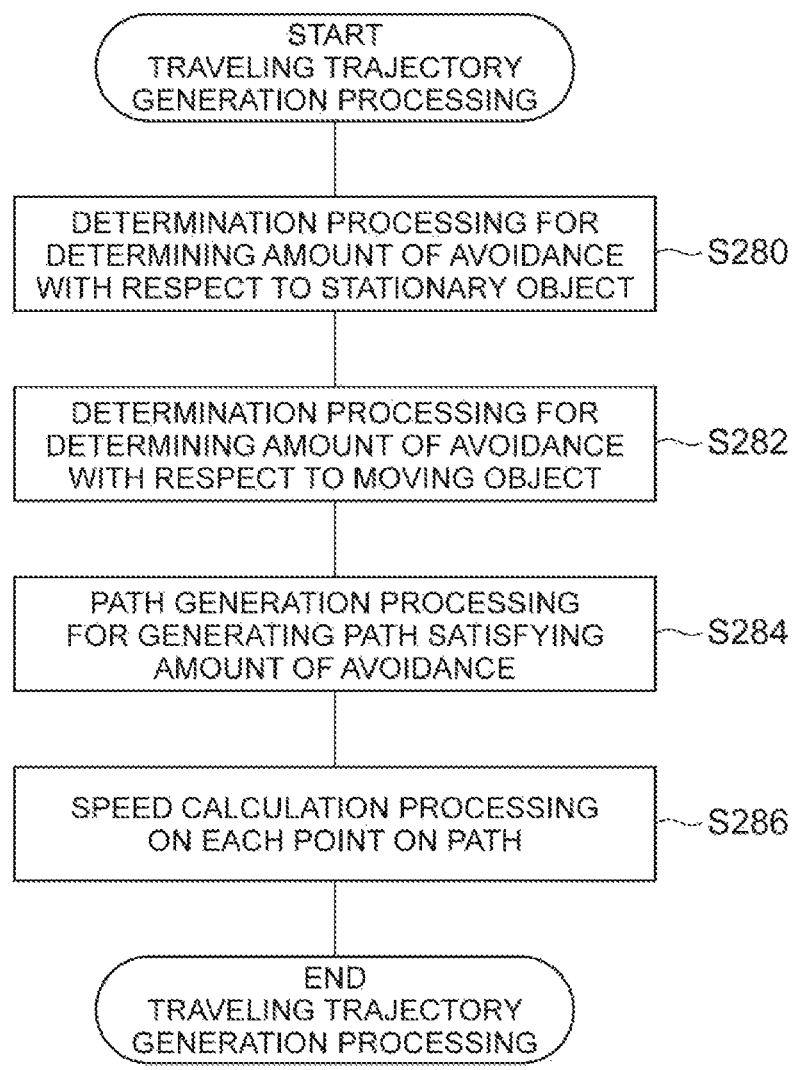
FIG. 8 is a flowchart illustrating an example of traveling trajectory generation processing.

Subsequently, as traveling trajectory generation processing (S28), the control unit 276 generates a traveling trajectory of the vehicle 2. FIG. 8 is a flowchart illustrating an example of the traveling trajectory generation processing.

As illustrated in FIG. 8, as determination processing (S280), the control unit 276 determines the amount of avoidance with respect to the stationary object. The amount of avoidance is an amount of movement when vehicle 2 keeps away from the object. Subsequently, as determination processing (S282), the control unit 276 determines the amount of avoidance with respect to the moving object (S282). The amount of avoidance with respect to the moving object is determined to be greater than the amount of avoidance with respect the stationary object. Subsequently, as path generation processing (S284), the control unit 276 generates a path satisfying the amount of avoidance using a geometric calculation and the like. As speed calculation processing (S286), the control unit 276 generates a travel plan corresponding to the selected trajectory. The autonomous driving ECU 27 generates the travel plan corresponding to the traveling trajectory of the vehicle 2 based on the result of detection performed by the external sensor 22 and the map 24. The autonomous driving ECU 27 generates the travel plan in a range not exceeding the speed limit in the traveling lane using the speed limit recorded in the map 24.

The control unit 276 outputs the generated travel plan as the traveling trajectory of the vehicle 2 in which two elements configured with a target position p in the coordinate system fixed to the vehicle 2 and the speed V at each target point are combined, that is, a travel plan having a plurality of configuration coordinates (p, V). Here, each target position p has a position or information equivalent thereto having at least x coordinate and y coordinate in a coordinate system fixed to the vehicle 2. The travel plan is not particularly limited as long as the plan describes the behavior of the vehicle 2. In the travel plan, for example, a target time t may be used instead of the speed V, or the target time t and the orientation of the vehicle 2 at that time may be added. The travel plan may be data indicating a trend of the speed, acceleration, the deceleration, and the steering torque of the vehicle 2 when the vehicle 2 is traveling on the trajectory. The travel plan may also include a speed pattern, an acceleration or deceleration pattern, and a steering pattern of the vehicle 2.

When the speed calculation processing (S286) is completed, the processing returns to FIG. 7. As traveling processing (S30), the control unit 276 autonomously controls the traveling of the vehicle 2 based on the travel plan. The control unit 276 outputs a control signal corresponding to the travel plan to the actuator 30. In this way, the autonomous driving device 1 causes the vehicle 2 to travel in the first autonomous driving mode.

Details of the Second Autonomous Driving Mode

Figure 9:
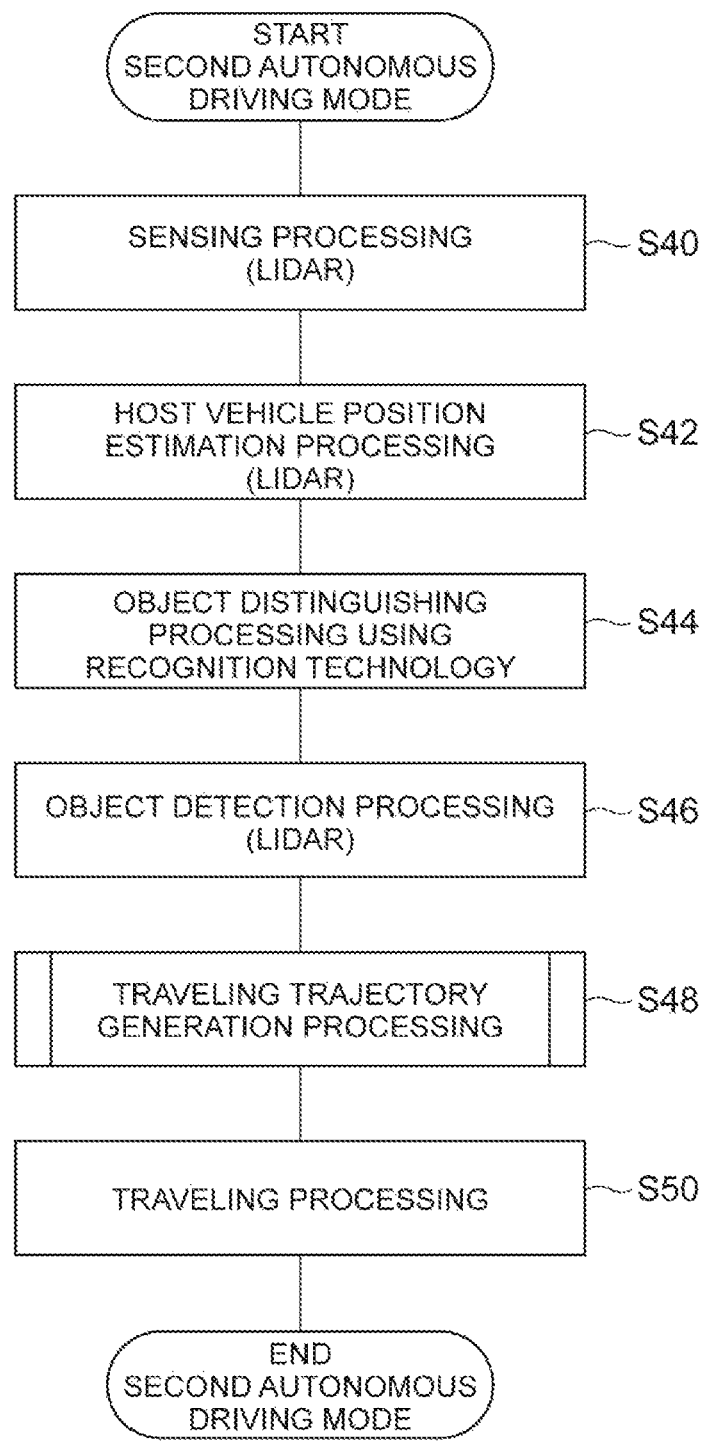
FIG. 9 is a flowchart illustrating an example of processing in a second autonomous driving mode.

FIG. 9 is a flowchart illustrating an example of processing in a second autonomous driving mode. The flowchart illustrated in FIG. 9 is executed by the autonomous driving device 1, for example, at the timing when the second autonomous driving mode is selected in the flowchart in FIG. 5.

Sensing processing (S40) and host vehicle position estimation processing (S42) illustrated in FIG. 9 are the same as the sensing processing (S20) and the host vehicle position estimation processing (S22) in FIG. 7.

Subsequently, as object distinguishing processing (S44), the control unit 276 distinguishes the stationary object and the moving object from the detected objects using only the result of detection performed by the LIDAR. The control unit 276 distinguishes the stationary object and the moving object by a known recognition technology using the LIDAR. That is, in the second autonomous driving mode, the control unit 276 distinguishes the stationary object and the moving object without using the stationary object information.

Object detection processing (S46), traveling trajectory generation processing (S48), and traveling processing (S50) are the same as the object detection processing (S26), the traveling trajectory generation processing (S28) and the traveling processing (S30) illustrated in FIG. 7. In this way, the autonomous driving device 1 causes the vehicle 2 to travel in the second autonomous driving mode.

Details of the Third Autonomous Driving Mode

Figure 10:
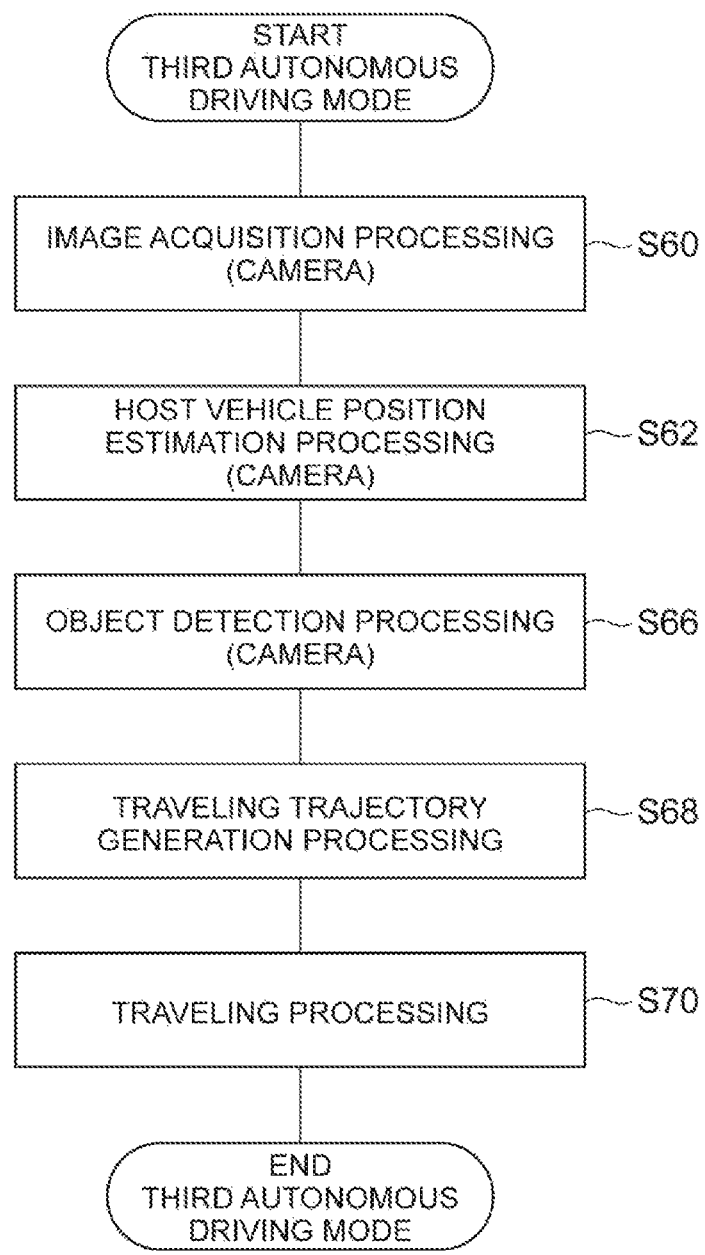
FIG. 10 is a flowchart illustrating an example of processing in a third autonomous driving mode.

FIG. 10 is a flowchart illustrating an example of processing in a third autonomous driving mode. The flowchart illustrated in FIG. 10 is executed by the autonomous driving device 1, for example, at the timing when the third autonomous driving mode is selected in the flowchart in FIG. 5.

As illustrated in FIG. 10, as image acquisition processing (S60), the control unit 276 of the autonomous driving ECU 27 acquires a result of imaging performed by the camera, in which the surroundings of the vehicle 2 is imaged. Subsequently, as the host vehicle position estimation processing (S62), the control unit 276 estimates the position and orientation of the vehicle 2 based on the results imaging performed by the camera obtained in the acquisition processing (S60). The control unit 276 estimates the position and orientation of the vehicle 2 in which a position error between the features included in the result of imaging performed by the camera and the features recorded in the map for the camera included in the map 24 becomes smallest, as the current position and orientation of the vehicle 2.

Subsequently, as object detection processing (S66), the control unit 276 detects the object using the result of imaging performed by the camera.

Subsequently, as traveling trajectory generation processing (S68), the control unit 276 generates a traveling trajectory of the vehicle 2. As traveling processing (S70), the control unit 276 autonomously controls the traveling of the vehicle 2 based on the travel plan. The traveling trajectory generation processing (S68) and the traveling processing (S70) may be the same as traveling trajectory generation processing (S28) and the traveling processing (S30) in FIG. 7. The control unit 276 outputs a control signal corresponding to the travel plan to the actuator 30. As described above, the autonomous driving device 1 causes the vehicle 2 to travel in the third autonomous driving mode.

Details of the Fourth Autonomous Driving Mode

Figure 11:
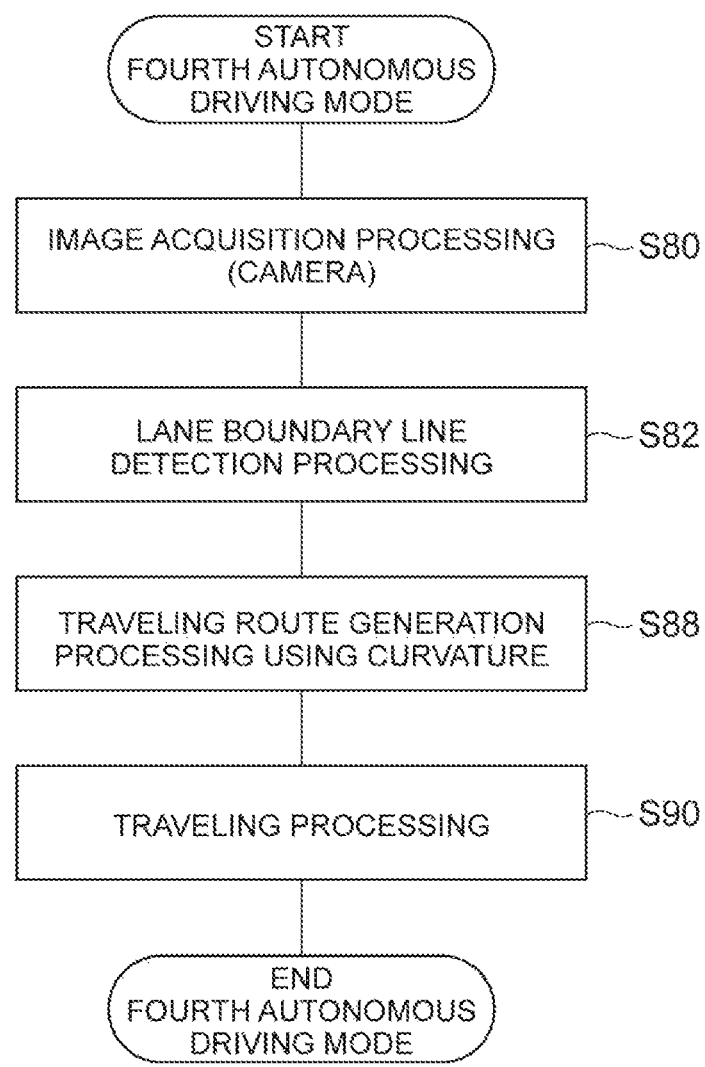
FIG. 11 is a flowchart illustrating an example of processing in a fourth autonomous driving mode.

FIG. 11 is a flowchart illustrating an example of processing in a fourth autonomous driving mode. The flowchart illustrated in FIG. 11 is executed by the autonomous driving device 1, for example, at the timing when the fourth autonomous driving mode is selected in the flowchart in FIG. 5.

As illustrated in FIG. 11, as image acquisition processing (S80), the control unit 276 of the autonomous driving ECU 27 acquires a result of imaging performed by the camera, in which the surroundings of the vehicle 2 is imaged. Subsequently, as lane boundary line detection processing (S82), the control unit 276 detects the lane boundary line based on the result of imaging performed by the camera obtained in the acquisition processing (S80).

Subsequently, as traveling trajectory generation processing (S88), the control unit 276 generates a traveling trajectory of the vehicle 2. For example, the control unit 276 generates a traveling trajectory such that the vehicle 2 travels through the center of the traveling lane ahead of a traveling section to the extent of range that can be imaged by the camera. The control unit 276 acquires the curvature of the curve in the traveling section referring to the curvature of the curve recorded in the map 24. The control unit 276 determines the traveling trajectory based on the acquired curvature of the curve and the result of imaging performed by the camera. As traveling processing (S90), the control unit 276 causes the vehicle 2 to autonomously travel along the traveling trajectory. As described above, the autonomous driving device 1 causes the vehicle 2 to travel in the fourth autonomous driving mode.

Details of the Fifth Autonomous Driving Mode

Figure 12:
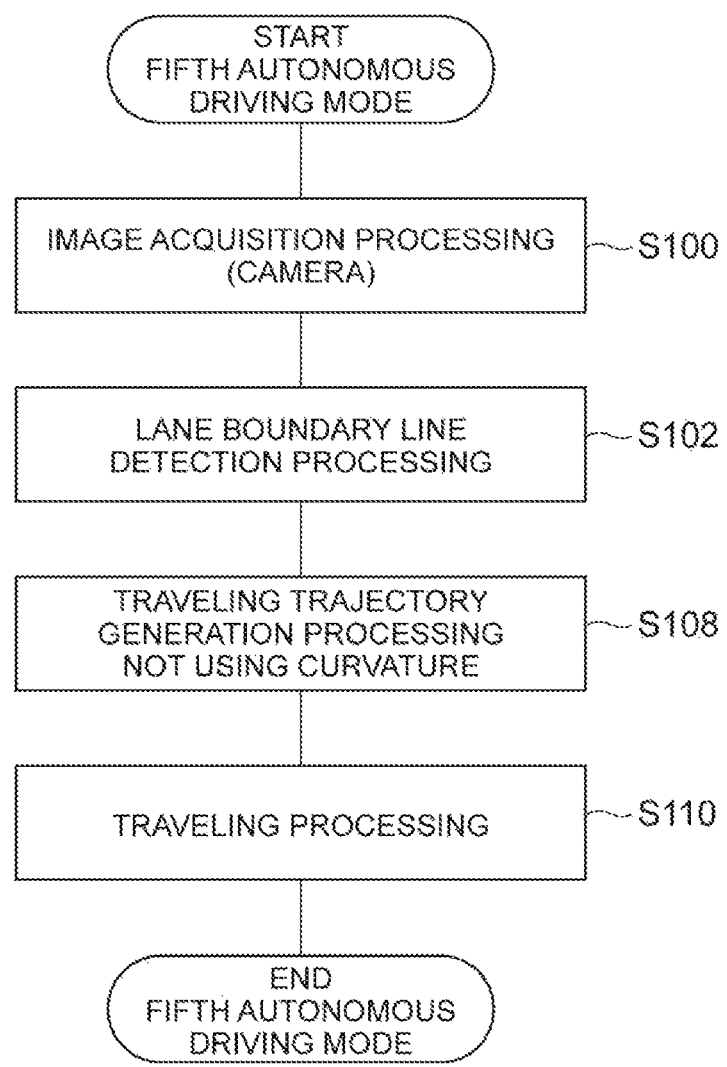
FIG. 12 is a flowchart illustrating an example of processing in a fifth autonomous driving mode.

FIG. 12 is a flowchart illustrating an example of processing in a fifth autonomous driving mode. The flowchart illustrated in FIG. 12 is executed by the autonomous driving device 1, for example, at the timing when the fifth autonomous driving mode is selected in the flowchart in FIG. 5.

Image acquisition processing (S100) and lane boundary line detection processing (S102) illustrated in FIG. 12 are the same as the image acquisition processing (S80) and the lane boundary line detection processing (S82) illustrated in FIG. 11.

Subsequently, as traveling trajectory generation processing (S108), the control unit 276 generates a traveling trajectory of the vehicle 2. The control unit 276 determines the traveling trajectory based only on the result of imaging performed by the camera. As traveling processing (S110), the control unit 276 causes the vehicle 2 to autonomously travel along the traveling trajectory. As described above, the autonomous driving device 1 causes the vehicle 2 to travel in the fifth autonomous driving mode.

Operational Effects of the First Embodiment

In the autonomous driving device 1 in the first embodiment, the selection unit 274 selects the executable autonomous driving mode from a plurality of autonomous driving modes based on the type of content recorded in the map 24 and the type of content necessary for the execution of the autonomous driving mode. When the number of executable autonomous driving modes is plural, one autonomous driving mode is determined based on the order of priority set to the autonomous driving modes in advance. As described above, when the number of executable autonomous driving modes is plural, this device can determine one autonomous driving mode according to the order of priority.

In addition, the autonomous driving device 1 in the first embodiment can use an unorganized map. Therefore, it is possible to reduce an organizing cost and an organizing burden of the map.

Second Embodiment

A configuration of an autonomous driving device in a second embodiment differs from the configuration of the autonomous driving device 1 in the first embodiment in a point that the priority table is switched, and others are the same. Hereinafter, the duplicated descriptions will not be repeated.

Stationary objects such as plants vary depending on the season. For example, in the winter season (an example of a season in which the information on the stationary object is sparse compared to the other seasons), since the plants are depleted, the information on the stationary object will easily be sparse compared to that in other seasons. Therefore, in the winter season, the difference between the result of detection by the sensor and the information in the map may easily become large. Accordingly, the selection unit 274 of the autonomous driving ECU 27 changes the priority table according to the season.

It is assumed that the map 24 includes information on the stationary object as a content. In the first autonomous driving mode, it is assumed that the information on the stationary object is acquired from the map 24 (for example, the object distinguishing processing (S24) in FIG. 7). In the second autonomous driving mode, it is assumed that the information on the stationary object is acquired from the results of detection performed by the sensor (for example, the object distinguishing processing (S44) in FIG. 9).

Figure 13:
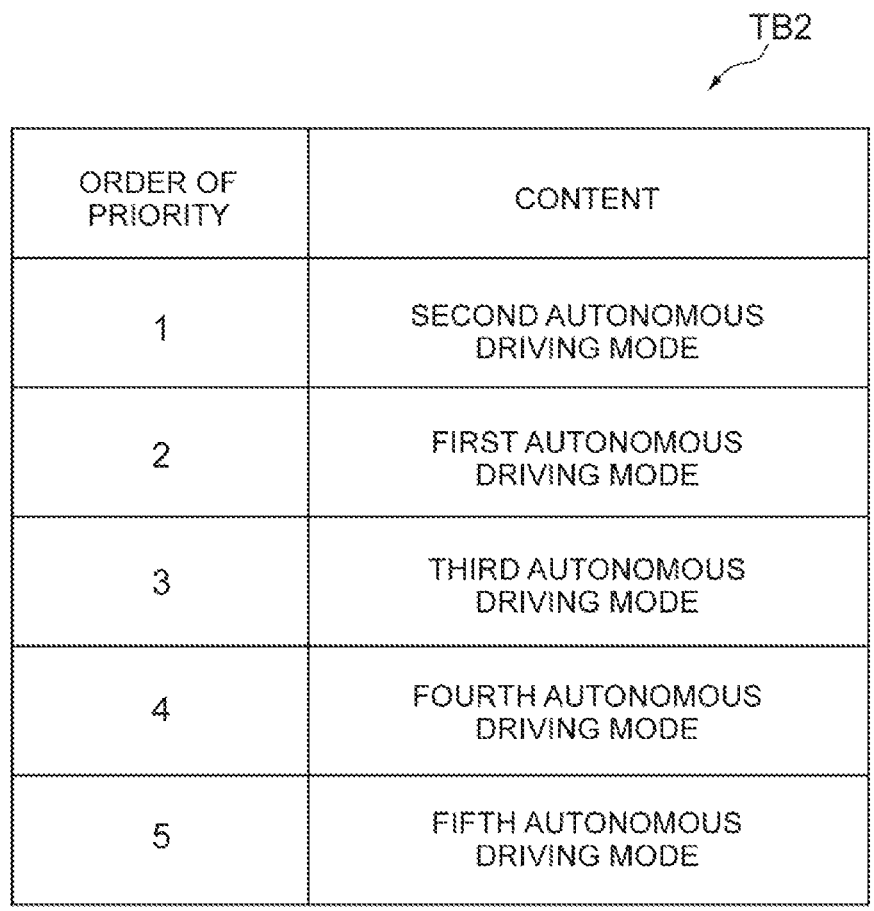
FIG. 13 illustrates an example of a priority table.

In this case, the selection unit 274 determines whether or not the current season is the winter season, and when it is determined to be the winter season, a different priority table is used. FIG. 13 illustrates an example of a priority table. In the priority table TB2 illustrated in FIG. 13 comparing with the priority table TB1, the order of priority of the first autonomous driving mode and the order of priority of the second driving mode order are reversed, and other are the same. Using the priority table TB2, the selection unit 274 can preferentially select the second autonomous driving mode over the first autonomous driving mode. The selection unit 274 may prepare a priority table according to the season. Other configurations and operations are the same as those in the first embodiment.

Modification Example of the Second Embodiment

The selection unit 274 may switch the priority table using a rate of variation recorded in the map 24. For example, when the content acquired by the acquisition unit 270 is the information on the stationary object and when the rate of variation is equal to or greater than a predetermined value, the selection unit 274 adopts the priority table TB2, and when the rate of variation is not equal to or greater than a predetermined value, the selection unit 274 adopts the priority table TB1. As described above, when it is predicted that the reliability of the map deteriorates, the autonomous driving mode mainly using the sensor can be prioritized.

Operational Effects of the Second Embodiment

In the season when the information on the stationary object obtainable from the map 24 is expected to be sparse, the autonomous driving device can prioritize the autonomous driving based on the sensors rather than the autonomous driving based on the map 24. In addition, in the season when the information on the stationary object obtainable from the map 24 is expected to significantly change, the autonomous driving device can prioritize the autonomous driving based on the sensors rather than the autonomous driving based on the map 24.

Third Embodiment

A configuration of an autonomous driving device in a third embodiment differs from the configuration of the autonomous driving device 1 in the first embodiment in a point that the priority table is switched according to the position, and others are the same. Hereinafter, the duplicated descriptions will not be repeated.

Figure 14:
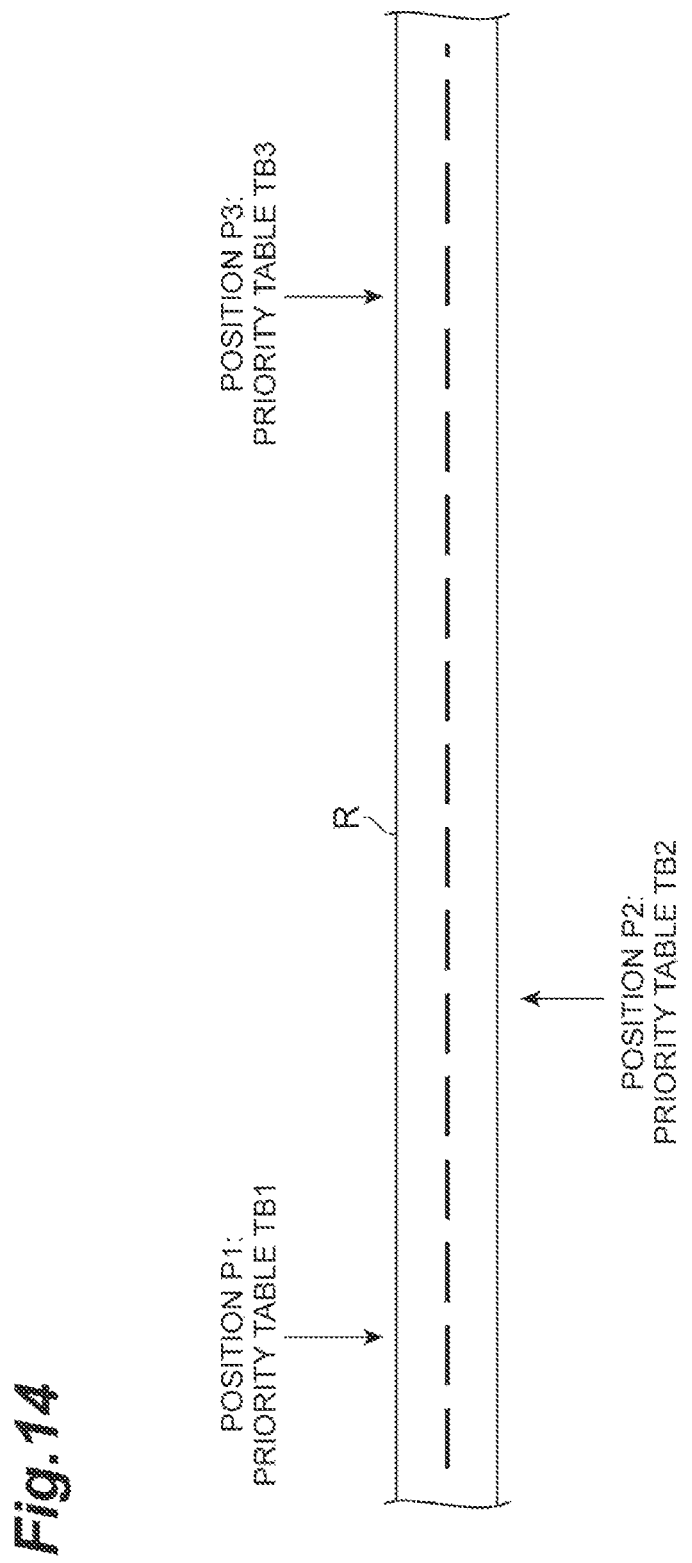
FIG. 14 is a diagram for explaining relationships between a position and the priority table.

FIG. 14 is a diagram for explaining the relationships between the position and the priority table. As illustrated in FIG. 14, the priority tables associated with each position are different from each other. For example, a position P1 and a priority table TB1 are associated with each other. In addition, a position P2 and a priority table TB2 are associated with each other. In addition, a position P3 and a priority table TB3 are associated with each other. Such associations may be recorded in the map 24.

The selection unit 274 obtains the position of the vehicle 2 on the map using the position information of the vehicle 2 received by the GPS receiver 21. The selection unit 274 obtains the priority table corresponding to the position (a first position) of the vehicle 2 referring to the map 24. Other configurations and operations are the same as those in the second embodiment.

Operational Effects of the Third Embodiment

The autonomous driving device can be configured to set the priority based on the position whether to prioritize the autonomous driving based on the map 24 or to prioritize the autonomous driving based on the sensors.

Fourth Embodiment

A configuration of an autonomous driving device 1A in a fourth embodiment differs from the configuration of the autonomous driving device 1 in the first embodiment in a point that a part of the function of the selection unit 274A is different and the autonomous driving device 1A also includes a history database 28 (an example of a history storage unit), and others are the same. Hereinafter, the duplicated descriptions will not be repeated.

Figure 15:
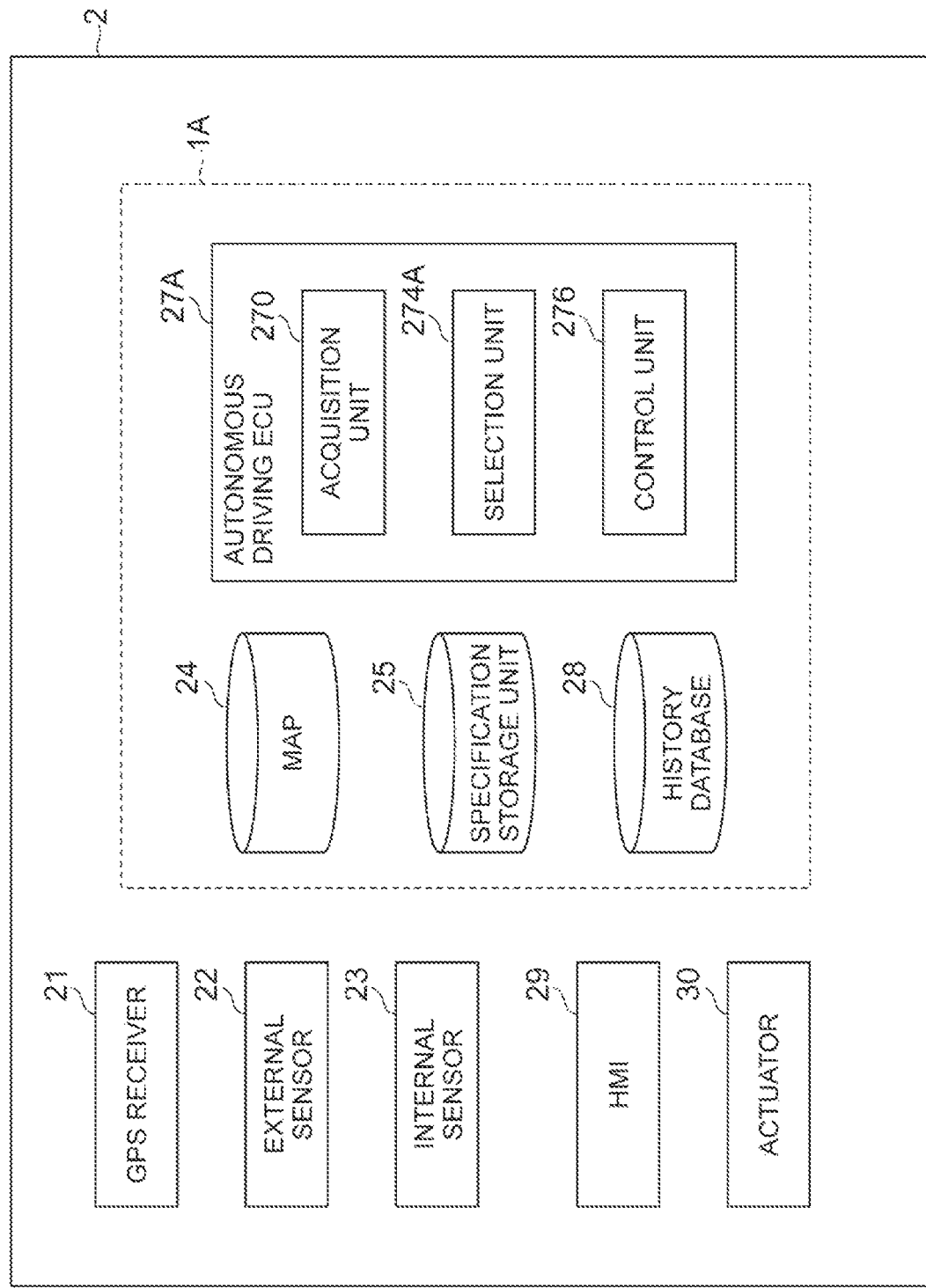
FIG. 15 is a block diagram illustrating an example of a configuration of a vehicle including an autonomous driving device in a fourth embodiment.

FIG. 15 is a block diagram illustrating an example of a configuration of a vehicle 2 including the autonomous driving device 1A in a fourth embodiment. As illustrated in FIG. 15, the autonomous driving device 1A includes a map 24, a specification storage unit 25, a history database 28, and an autonomous driving ECU 27A.

The autonomous driving ECU 27A stores a driving history of the vehicle 2 in the history database 28. The autonomous driving ECU 27A stores history information and the autonomous driving mode selected by the selection unit 274A in association with each other in the history database 28. The history information is a driving status when the autonomous driving is performed using the map selected by the selection unit 274A. The history information includes the presence or absence of an override. The override is a driver's intervention to the autonomous driving. The history database 28 is a database in which the autonomous driving mode and the history information selected by the selection unit 274A are associated with each other.

The selection unit 274A differs from the selection unit 274 in the logic of selecting the autonomous driving mode. Specifically, the selection unit 274A selects the autonomous driving mode under a predetermined condition different from the priority table. An example of the predetermined condition relates to a history of autonomous driving. The selection unit 274A generates an override occurrence rate for each autonomous driving mode based on the number of overrides at a predetermined time referring to the history database 28. The selection unit 274A selects an autonomous driving mode having a low override occurrence rate from a plurality of executable autonomous driving modes.

The selection unit 274A may select an autonomous driving mode having a low override occurrence rate from a plurality of executable autonomous driving modes within a predetermined period of time. Alternatively, the selection unit 274A may select an autonomous driving mode having the number of overrides zero at the nearest traveling time. In addition, the selection unit 274A may acquire aggregated history information from a plurality of vehicles from a server in the central management center or the like. Other configurations are the same as those in the first embodiment.

Operational Effects of the Fourth Embodiment

According to the autonomous driving device 1A in the fourth embodiment, it is possible to select one autonomous driving mode based on the history information from a plurality of executable autonomous driving modes.

Fifth Embodiment

A configuration of an autonomous driving device 1B in a fifth embodiment differs from the configuration of the autonomous driving device 1 in the first embodiment in points that a part of the function of a selection unit 274B is different and the autonomous driving ECU 27B includes a measuring unit 271 and a determination unit 272, and others are the same. Hereinafter, the duplicated descriptions will not be repeated.

Figure 16:
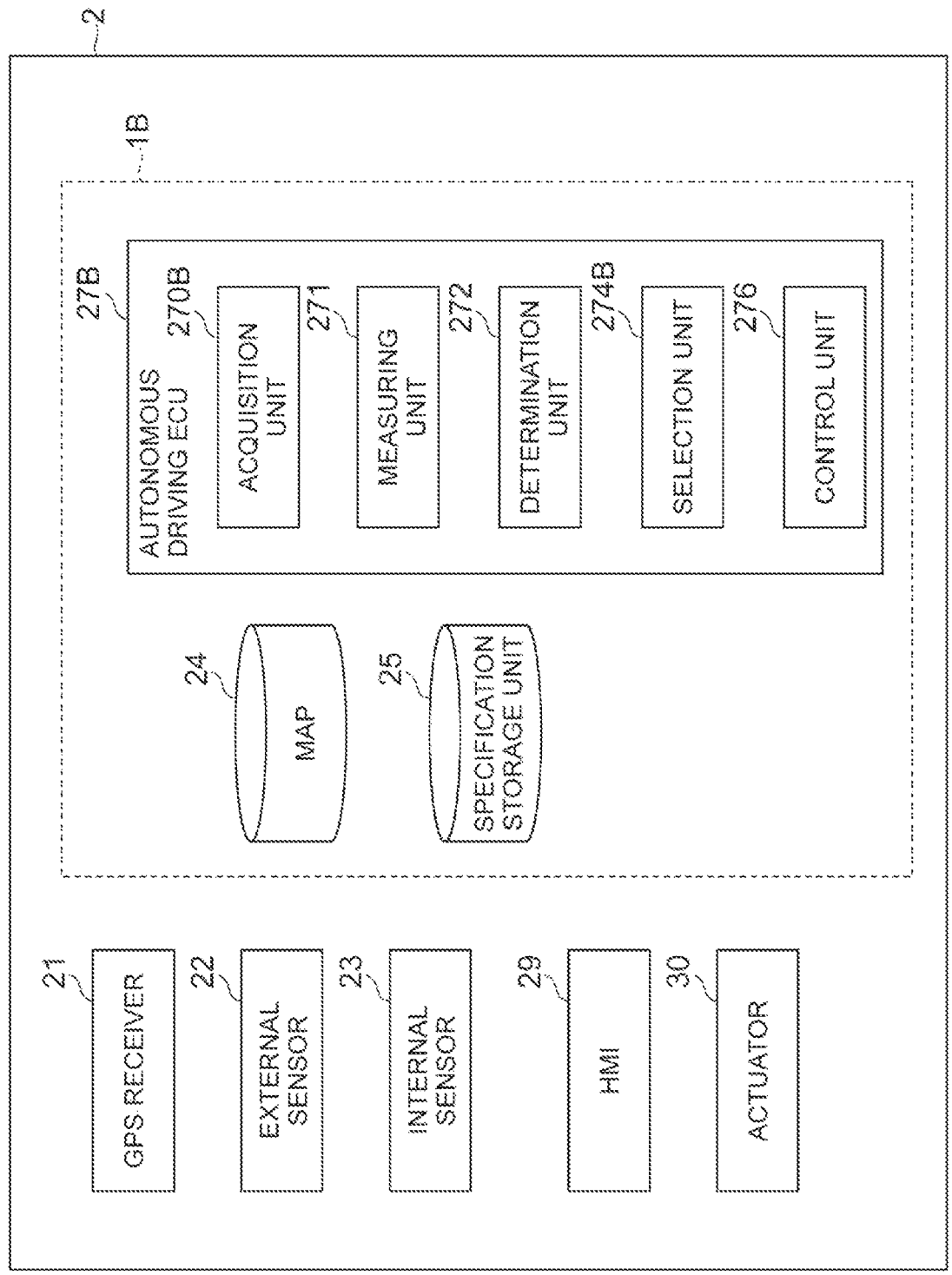
FIG. 16 is a block diagram illustrating an example of a configuration of a vehicle including an autonomous driving device in a fifth embodiment.

FIG. 16 is a block diagram illustrating an example of a configuration of a vehicle 2 including the autonomous driving device 1B in the fifth embodiment. As illustrated in FIG. 16, the autonomous driving device 1B includes a map 24, a specification storage unit 25, and an autonomous driving ECU 27B.

The autonomous driving ECU 27B includes an acquisition unit 270B, the measuring unit 271, the determination unit 272, a selection unit 274B, and a control unit 276.

The measuring unit 271 measures a position of the vehicle 2 via communications. The measuring unit 271 measures the position of the vehicle 2, for example, using the GPS receiver 21. The determination unit 272 determines consecutive scheduled traveling positions on the map 24 based on the position of the vehicle 2 measured by the measuring unit 271. The consecutive scheduled traveling positions are present in a scheduled traveling section up to a position a predetermined distance away from the position of the vehicle 2. When the destination is set by the driver, the determination unit 272 sets an endpoint on the route from the position of the vehicle 2 to the destination, and sets the scheduled traveling positions in the section from the position of the vehicle 2 to the endpoint. When the destination is not set, the determination unit 272 sets an endpoint on the route such that the vehicle 2 travels while keeping the current lane, and sets the scheduled traveling positions in the section from the position of the vehicle 2 to the endpoint.

The acquisition unit 270B acquires the content corresponding to the scheduled traveling positions determined by the determination unit 272.

The selection unit 274B selects an autonomous driving mode executable at each of the plurality of consecutive scheduled traveling positions on the map determined by the determination unit 272. The selection unit 274B preferentially selects the autonomous driving mode commonly executable at all the scheduled traveling positions from the executable autonomous driving modes selected for each of the scheduled traveling positions, as the autonomous driving mode executable at each of the plurality of consecutive scheduled traveling positions on the map. Other configurations are the same as those in the first embodiment.

Mode Selection Processing

FIG. 17 is a flowchart illustrating an example of the mode selection processing. For example, the flowchart illustrated in FIG. 17 is executed by the autonomous driving device 1B at the timing when the ON-operation of the autonomous driving function by the driver of the vehicle 2 is received.

As illustrated in FIG. 17, as position measurement processing (S116), the measuring unit 271 of the autonomous driving ECU 27B measures the position of the vehicle 2 using the GPS receiver 21.

Subsequently, as scheduled traveling position determination processing (S118), the determination unit 272 of the autonomous driving ECU 27B determines the consecutive scheduled traveling positions on the map 24 based on the position of the vehicle 2 measured by the measuring unit 271.

Subsequently, as content acquisition processing (S120), the acquisition unit 270B of the autonomous driving ECU 27B acquires a content corresponding to the scheduled traveling position determined by the determination unit 272.

Subsequently, as selection processing (S122), the selection unit 274B of the autonomous driving ECU 27B selects an executable autonomous driving mode from the first to fifth autonomous driving modes based on the type of content acquired in the content acquisition processing (S120) and the type of content stored in the specification storage unit 25.

Subsequently, as determination processing (S126), the selection unit 274B preferentially selects the autonomous driving mode commonly executable at all the scheduled traveling positions from the executable autonomous driving modes selected in the selection processing (S122), as the autonomous driving mode executable at each of the plurality of consecutive scheduled traveling positions on the map. When the number of commonly executable autonomous driving modes is plural, the selection unit 274B determines the autonomous driving mode using the priority table.

When the determination processing (S126) is completed, the autonomous driving ECU 27B ends the flowchart illustrated in FIG. 17. As described above, the autonomous driving ECU 27B is configured to be able to select one autonomous driving mode commonly executable at the consecutive scheduled traveling positions. The flowchart illustrated in FIG. 17 can be executed again every time the traveling position changes or at a predetermined period.

Operational Effects of the Fifth Embodiment

According to the autonomous driving device 1B in the fifth embodiment, it is possible to avoid the switching of the autonomous driving mode every time the map data is insufficient.

The embodiments described above can be implemented in various forms resulting from various modifications and improvements based on the knowledges of those who are skilled in the art.

In the description of the embodiments above, the autonomous driving device includes a map 24, but not limited thereto. For example, an autonomous driving device may include equal to or more than two maps. The vehicle 2 may acquire the map and the priority table from a server in the central management center or the like. In addition, the vehicle 2 may acquire the map update information and priority table update information from the server in the central management center or the like.

What is claimed is:

1. An autonomous driving device configured to perform autonomous driving of a vehicle, comprising:
   a map that stores map information, including a plurality of contents and positions that are associated with each other, the map information further including a plurality of priority tables associated with the positions, each of the plurality of priority tables including an order of priority and an order of driving mode in association with each other;
   an electronic control unit configured to selectively operate in a plurality of autonomous driving modes, wherein the electronic control unit is programmed to:
   determine a first position of the vehicle detected by a sensor of the vehicle;
   acquire content and a priority table from among the plurality of priority tables stored in the map that corresponds to the first position;
   select at least one executable autonomous driving mode from among the plurality of autonomous driving modes based on the content acquired corresponding to the first position;
   determine whether the at least one executable autonomous driving mode is a plurality of executable driving modes,
   based upon the determination that the at least one executable autonomous driving mode is the plurality of executable driving modes, one autonomous driving mode is selected from the plurality of executable driving modes based on an order of priority included in the acquired priority table; and
   control the vehicle at the first position in the one autonomous driving mode selected from the plurality of executable driving modes.

2. The autonomous driving device according to claim 1, further comprising a human machine interface (HMI) that performs inputting and outputting of information between the autonomous driving device and a vehicle occupant.

3. The autonomous driving device according to claim 1,
   wherein the map is configured to record information on a stationary object as the content,
   the plurality of autonomous driving modes includes a first autonomous driving mode in which the information on the stationary object is acquired from the map and a second autonomous driving mode in which the information on the stationary object is acquired from a result of detection performed by the sensor, and
   the electronic control unit is programmed to preferentially select the second autonomous driving mode before the first autonomous driving mode, when the content acquired is the information on the stationary object and a current season is a season in which the information on the stationary object is sparse compared to the other seasons.

4. The autonomous driving device according to claim 1,
   wherein the map is configured to record information on a stationary object as the content,
   the information on the stationary object includes a position of the stationary object and a rate of variation indicating a change of the stationary object per a unit time,
   the plurality of autonomous driving modes includes a first autonomous driving mode in which the information on the stationary object is acquired from the map and a second autonomous driving mode in which the information on the stationary object is acquired from a result of detection performed by a sensor, and the electronic control unit is programmed to preferentially select the second autonomous driving mode before the first autonomous driving mode, when the content acquired is the information on the stationary object and the rate of variation is equal to or greater than a predetermined value.

5. The autonomous driving device according to claim 1, further comprising:

a history database that includes the autonomous driving mode selected by the selection unit and history information on a presence or absence of an override in association with each other, wherein the electronic control unit is programmed to not select the autonomous driving mode having an override occurrence rate equal to or greater than a predetermined value referring to the history database.

6. The autonomous driving device according to claim 1, wherein the electronic control unit is further programmed to:

measure a position of the vehicle using a Global Positioning System (GPS);

determine a plurality of consecutive scheduled traveling positions on the map based on the measured position of the vehicle, select the executable autonomous driving mode at each of the plurality of consecutive scheduled traveling positions on the map, and select the autonomous driving mode commonly executable at all the scheduled traveling positions from the executable autonomous driving modes selected for each of the scheduled traveling positions, as the autonomous driving mode executable at each of the plurality of consecutive scheduled traveling positions on the map.

* * * * *